United States Patent [19]
Howell et al.

[11] 4,272,813
[45] Jun. 9, 1981

[54] COMMUNICATING TYPEWRITER AND DICTATION SYSTEM UTILIZING ANALOG RECORDING AND TRANSMISSION TECHNIQUES

[75] Inventors: Dan M. Howell; Robert A. Kolpek; William M. Schuller, all of Lexington, Ky.

[73] Assignee: International Business Machines Corporation, Armonk, N.Y.

[21] Appl. No.: 26,251

[22] Filed: Apr. 2, 1979

[51] Int. Cl.³ .................. G06F 1/00; G11B 31/00; H04M 11/00
[52] U.S. Cl. .................. 364/900; 360/4; 179/2 DP
[58] Field of Search ... 364/900 MS File, 200 MS File; 360/4, 32; 179/2 DP; 358/903

[56] References Cited
U.S. PATENT DOCUMENTS

| | | | |
|---|---|---|---|
| 3,403,225 | 9/1968 | Mislan et al. | 179/2 R |
| 3,417,202 | 12/1968 | Kolpek | 179/2 R X |
| 3,512,132 | 5/1970 | Jones et al. | 364/900 |
| 3,512,137 | 5/1970 | Jones et al. | 364/900 |
| 3,528,063 | 9/1970 | Kolpek | 364/900 |
| 3,648,249 | 3/1972 | Goldsberry | 364/900 |
| 3,956,740 | 5/1976 | Jones et al. | 364/200 |
| 4,142,232 | 2/1979 | Harvey | 364/200 |

*Primary Examiner*—Raulfe B. Zache

*Attorney, Agent, or Firm*—Kenneth W. Hairston; George E. Grosser

[57] ABSTRACT

A combined communicating typewriter/dictation system which utilizes a common modem as an interface between an electronic typewriter, a mass media recorder and a communications line. The modem replaces digital logic and audio tones are recorded on the mass media recorder instead of digital tones. When the system is in a local mode, the digital keystroke signals from the typewriter are modulated by the modem and recorded by the mass media recorder. In a communications mode, the recorded keystroke signals are demodulated and then remodulated before transmission over the communications line to eliminate noise and other extraneous signals that tend to increase the error rate of the transmitted signals. When data is received by the system for storage on the mass media recorder, the transmitted data is demodulated and then remodulated by the modem to eliminate noise from the transmitted signal. In both communication paths, the analog signal input to the modem is processed twice before it is either forwarded to the mass media recorder or to the communications line. In addition to the foregoing recording functions, the mass media recorder can also be utilized to record and/or playback audio information. The dual utilization of the modem and the mass media recorder results in a low cost system without sacrificing much in the way of recording error rate.

14 Claims, 17 Drawing Figures

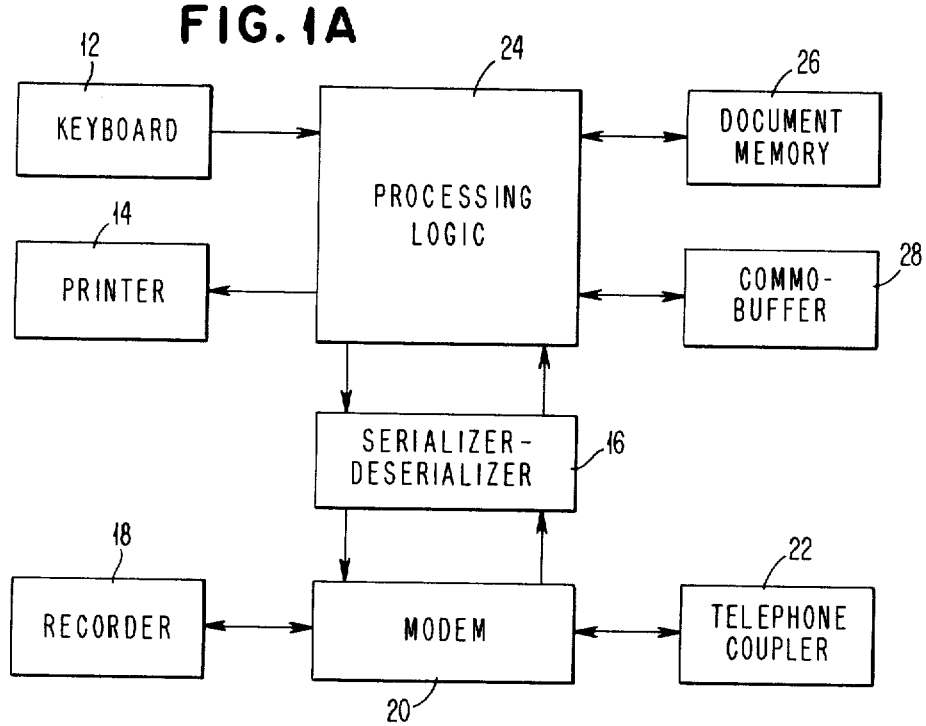
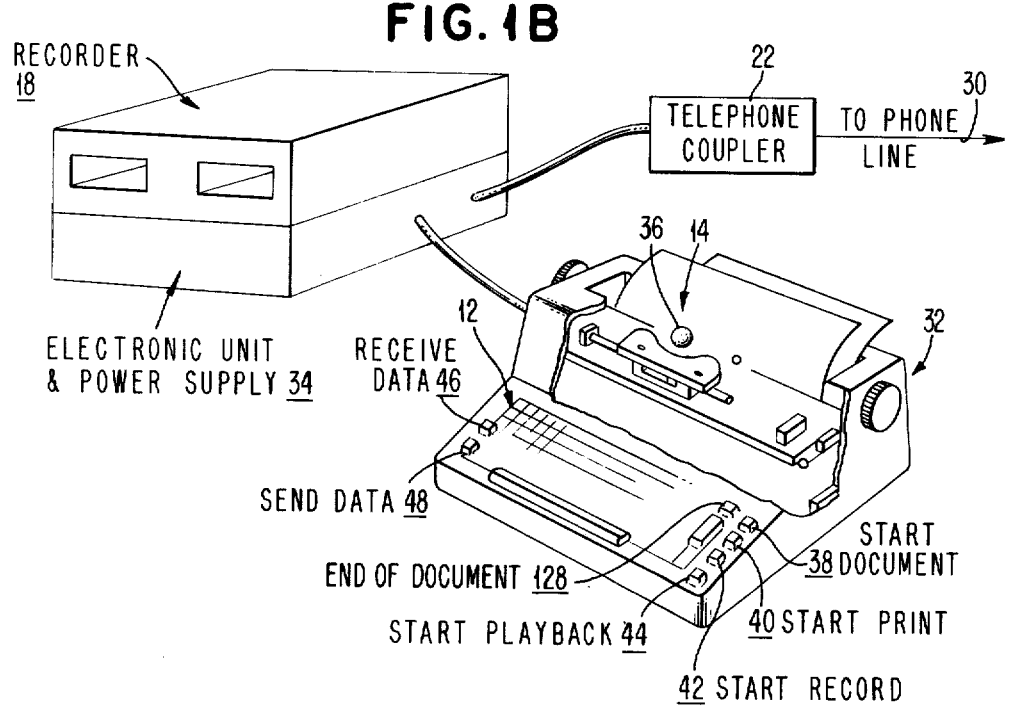

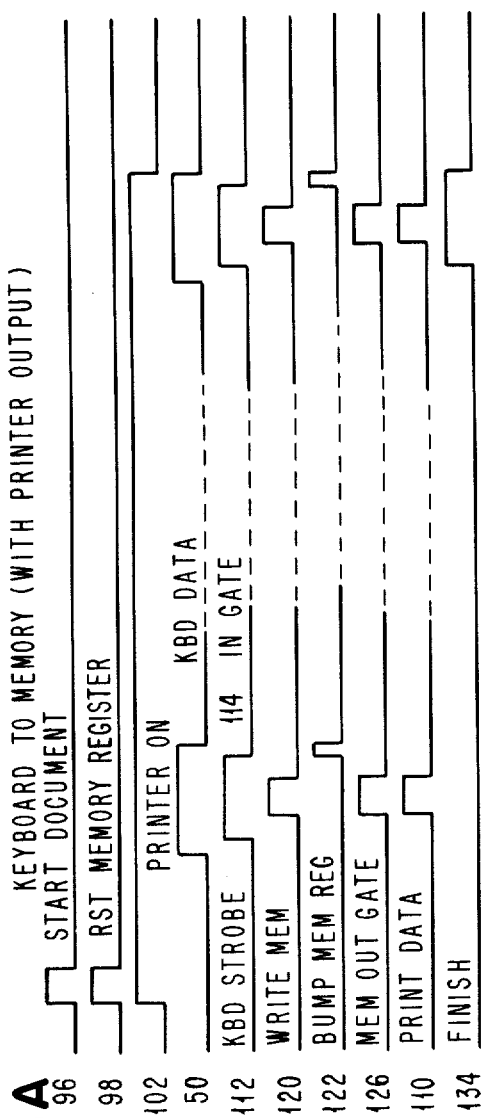
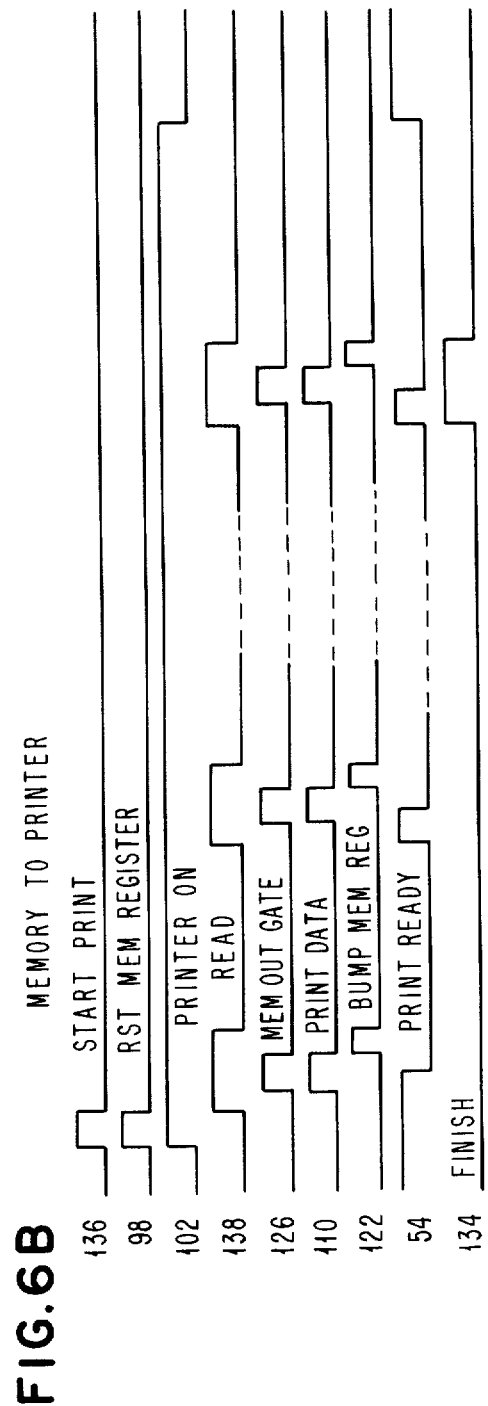

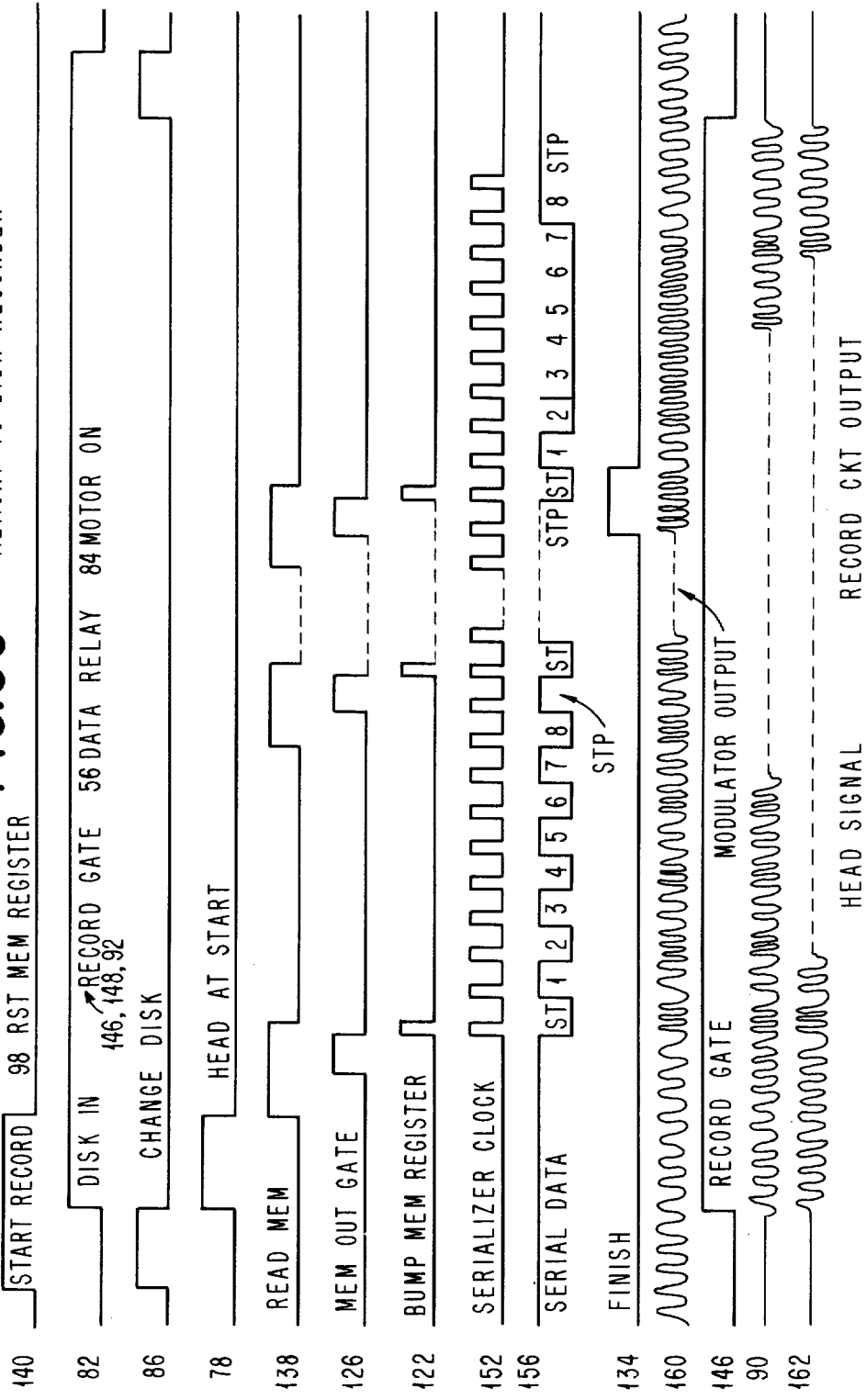

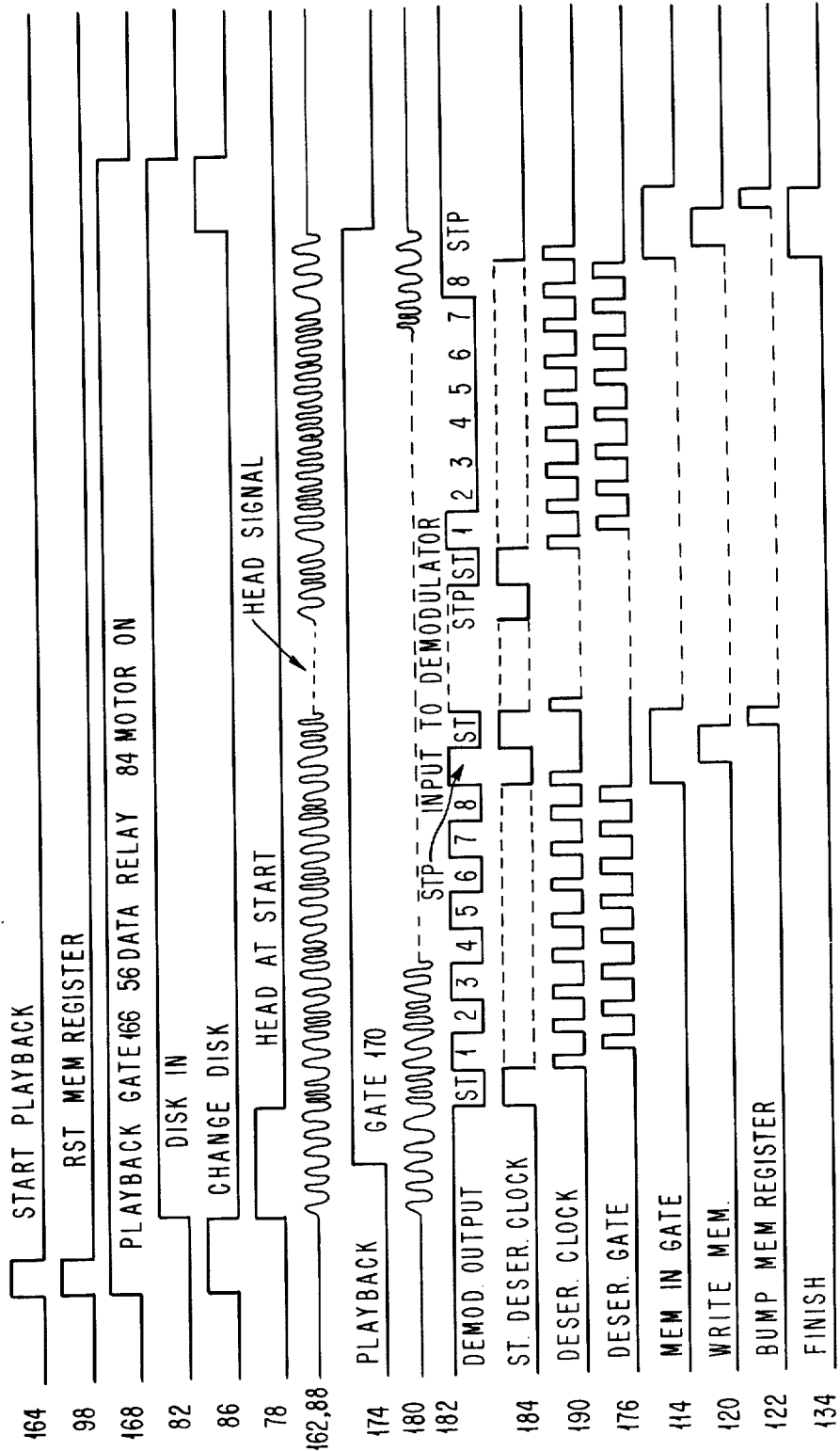

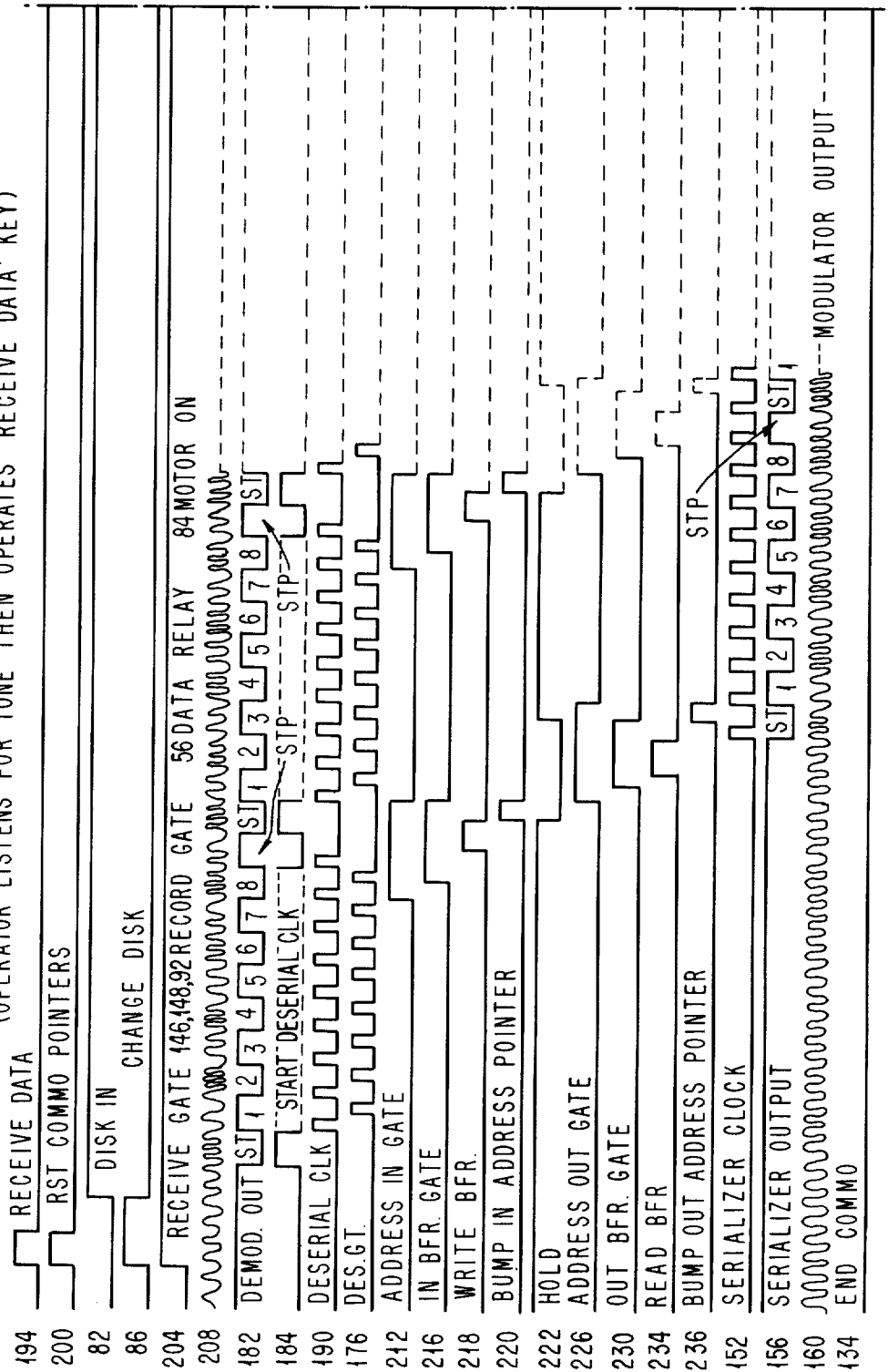

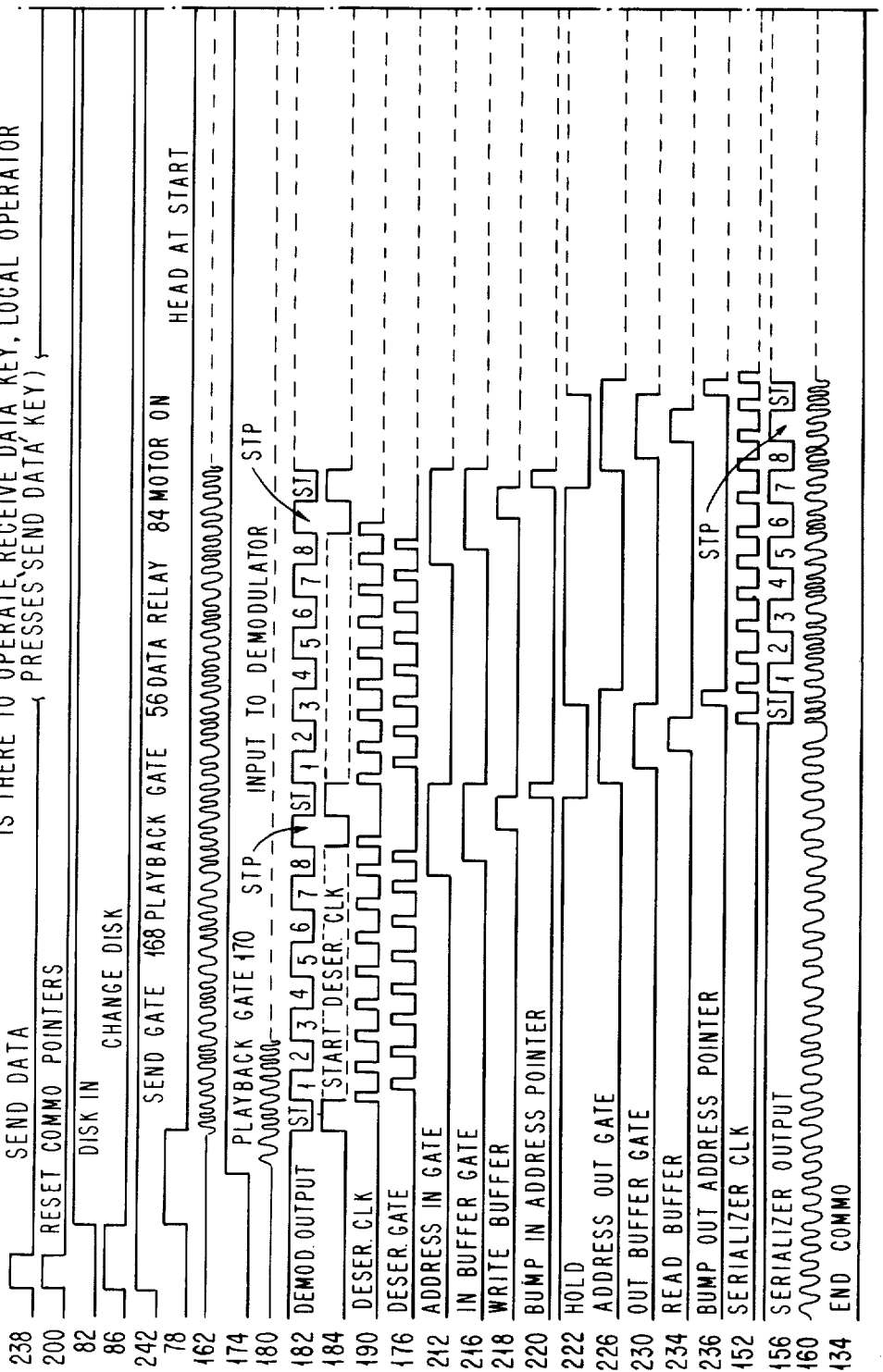

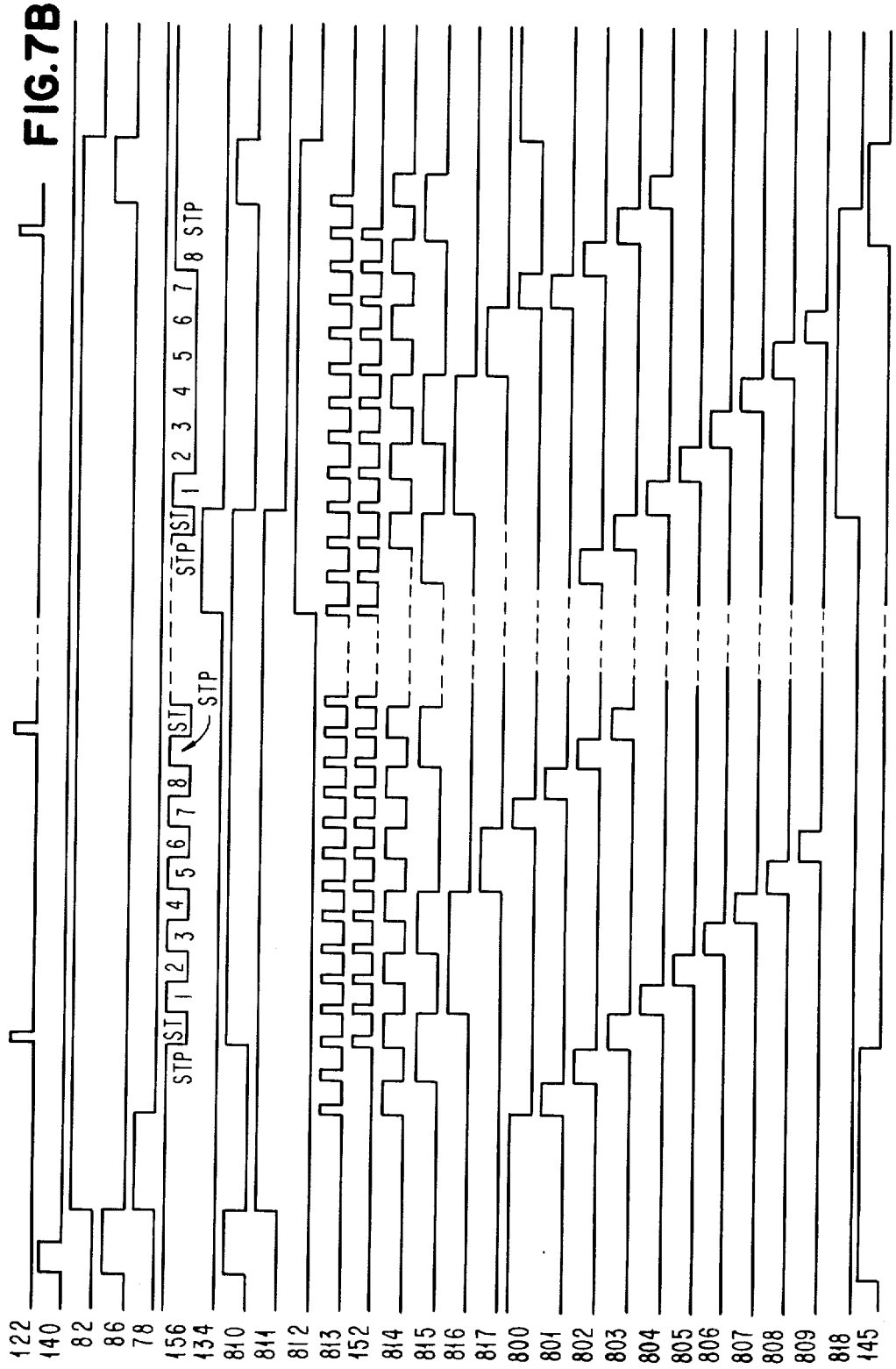

COMMUNICATING TYPEWRITER AND DICTATION SYSTEM UTILIZING ANALOG RECORDING AND TRANSMISSION TECHNIQUES

BACKGROUND OF THE INVENTION (1) Field of the Invention

This invention relates to a typed test processing and data communications system, and more particularly to a combined communicating typewriter/dictation system which utilizes a common modem to both demodulate and remodulate analog tones transmitted between the mass media recorder of the instant system and a remote system.

(2) Prior Art

Generally, recording devices in word processing environments utilize digital recording techniques. For example, the recorder described in U.S. Pat. No. 3,528,063 utilizes a digital recording technique because of the high densities obtainable with this type of recording. However, one current drawback to the use of this recording technique is cost. The cost of digital logic when compared to the recording rate is balanced only when the density of the recording rate is high and the error rate is low.

Moreover, the system described in U.S. Pat. No. 3,528,063 transmits and receives data that is digital in form. The logic needed to perform this function increases the cost of the system. A problem encountered in digital signal transmission is bit dropout, which increases the possibility of an erroneous transmission.

OBJECTS OF THE INVENTION

It is an object of this invention to provide a low cost word processing and communications system without sacrificing the error rate.

It is another object of this invention to utilize an analog recording technique to record the keystrokes of the typewriter as well as record the voice of the system user.

It is a further object of this invention to convert typed digital information into analog signals for recording by a conventional magnetic recorder and to accurately transmit this recorded analog information over telephone lines to a remote system.

SUMMARY OF THE INVENTION

The above objects are accomplished through the dual use of a modem in a communicating typewriter/dictation system to effect audio recording and/or playback and to effect the communications portion of transmitting audio tones over communication lines. Heretofore, the function of the system modem has been limited to only one of the two modes of operation. The system comprises an electronic typewriter with digital buffer located therein, a mass media recorder, a communications buffer, the modem and system control logic. At lower recording rates, modems become useful on low cost recording devices because of their ability to accept a high degree of distortion from a communications line. Modems offer characteristics to the recording systems that compensate for record-playback speed differences, and oxide dropout which is inherent to low cost magnetic recording media. The mass media recorder of the system records both analog keystroke information from the typewriter and human understandable audio information. The dual utilization of both the modem and the mass media recorder results in a significant cost savings to the system without a corresponding increase in the data error rate.

In the communications mode of operation, the modem is utilized to both demodulate data from the mass media recorder and remodulate it to the communications line. Mere playout of the recorded tones over the communications line would result in higher error rates. The demodulation-remodulation steps provide an almost perfect signal back to the line free of any distortion which might be introduced by the recording-playback operations. Moreover, when receiving signals from the communications line, the modem initially demodulates the incoming analog signal information and then remodulates this information before recording it in the mass media recorder. As a result of this dual pass through the modem, an almost perfect signal free from line distortion is recorded.

The foregoing and other features and advantages of the invention will be apparent from the following more particular description of the preferred embodiment of the invention, as illustrated in the accompanying drawing.

BRIEF DESCRIPTION OF THE DRAWING

FIG. 1A illustrates a block diagram of communicating typewriter/dictation system with the modem of the present invention located between them and a communications line;

FIG. 1B diagrammatically illustrates an equipment configuration for the communicating typewriter/dictation system of the present invention;

FIG. 6A illustrates a timing diagram showing the sequence of steps needed for keyed character signals to be inputted to memory;

FIG. 6B illustrates a timing diagram showing the sequence of steps needed for signals from memory to be outputted to the printer of the system;

FIG. 6C illustrates a timing diagram showing the sequence of steps needed for signals from memory to be recorded by the recorder of the system;

FIG. 6D illustrates a timing diagram showing the sequence of steps needed for signals from the recorder to be placed back into memory;

FIGS. 6E and 63-1 illustrates a timing diagram showing the sequence of steps needed for signals from the communications line to be recorded by the system recorder;

FIGS. 6F and 6F-1 illustrates a timing diagram showing the sequence of steps needed for signals from the system recorder to be outputted to the communications line;

FIGS. 7A and 7A-1 illustrates logic circuitry for carrying out the sequence of steps of FIG. 6C; and FIG. 7B illustrates a detailed timing diagram for carrying out the logic functions of FIG. 7A.

BRIEF DESCRIPTION OF THE PREFERRED EMBODIMENT

Figure 2:
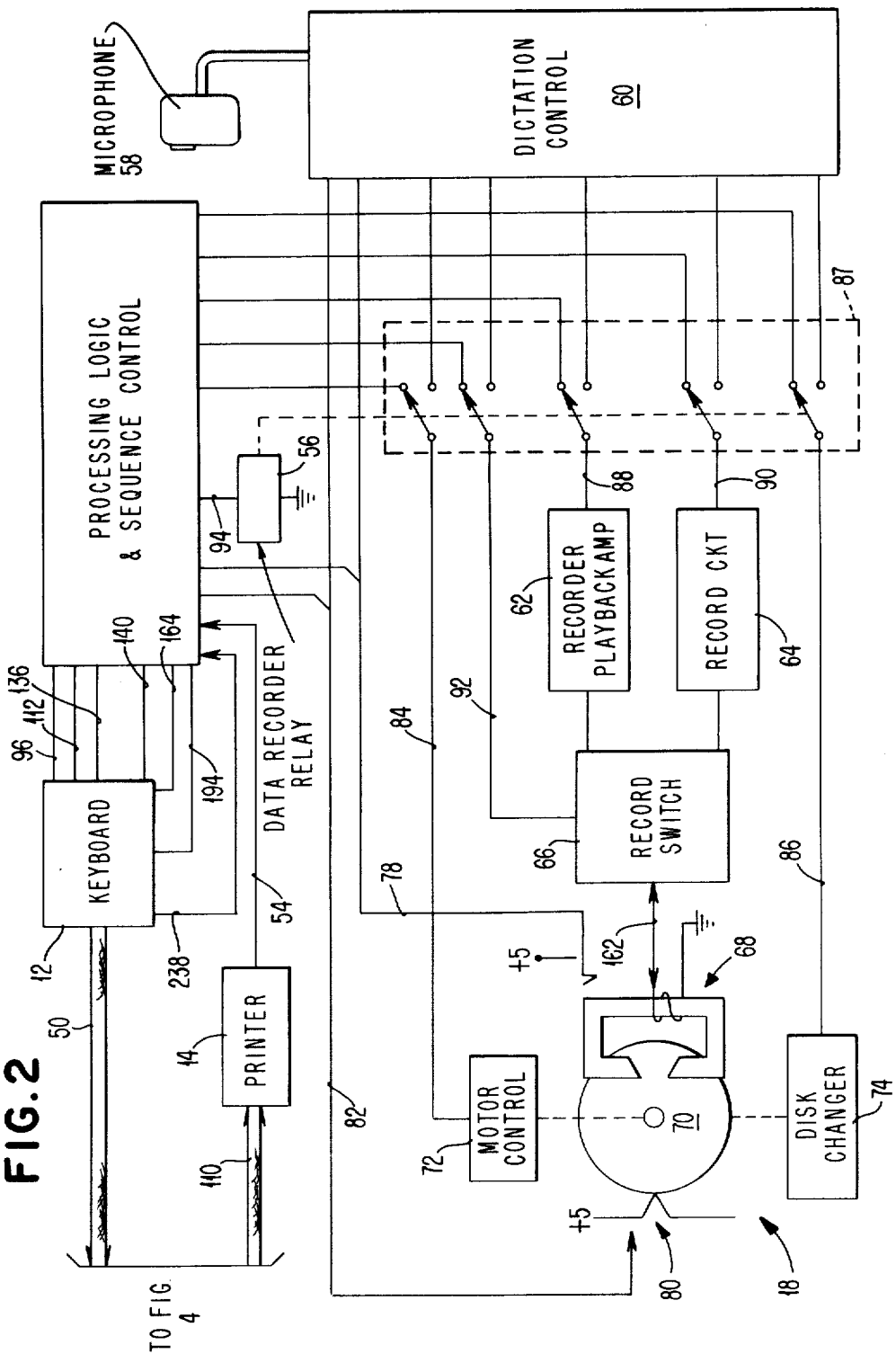
FIG. 2 illustrates a detailed block diagram of the system of FIGS. 1A and 1B.

The system of this invention includes a keyboard 12, which is the input for the system; a printer 14, the output device for the system; a serializer/deserializer 16; a conventional magnetic recorder 18; a modem 20; a telephone coupler 22; and some processing logic 24 which will control document memory 26, the communications buffer 28 and serializer/deserializer 16. This system differs from the one described in U.S. Pat. No. 3,528,063 in that the digital logic necessary to record digital signals is removed from the system and replaced with the modem of this invention in order that analog audio tones can be recorded in lieu of digital tones. Moreover, the system of this invention is using an AC recording technique as opposed to the saturated DC recording technique taught in the U.S. Pat. No. 3,528,063. The AC recording of this invention is in the voice recording range because the modulator portion of modem 20 converts the DC signal to 1300 and 2100 cycles (per second). In the process of making the analog recording, the keystrokes from keyboard 12 will be recorded by the system recorder as coded frequency shifts between 1300 and 2100 cycles.

A further advantage of using analog recording techniques is that the system user will be able to use the recorder for dictation/transcription (voice recording) purposes and essentially listen to a dictated voice recording and key this information into document memory 26. After typing the dictated material into document memory 26, the system operator can then record the keystroke information now in memory onto magnetic recording media (e.g., disk, cassette or belt) in recorder 18. A magnetic disk is used in this invention for recording purposes. As stated previously, before the information is recorded on recorder 18, the information first goes through modem 20 where it is converted to 1300 and 2100 cycle voice signals. During a playback operation, the recorder 18 will play the recorded signals back through the demodulator portion of modem 20 and the deserializer portion of serializer/deserializer 16 and after deserialization the signals can either be placed back into document memory 26 or via the communications buffer 28, this information can be fed back into the modulator portion of modem 20 and thereafter be gated to telephone coupler 22 for transmission to another system. The telephone coupler 22 supports the receiver/transmitter of a telephone (not shown) and captures audio signals as they are received and/or transmitted.

The buffer 28 is used in the system to reshape the signals coming from recorder 18 before they are placed on telephone line 30 of FIG. 1B. A further reason for using the communications buffer 28 and modem 20 is that recorder 18 will have speed tolerances that may vary from the time the original signal is recorded to the time the signal is played out through telephone line 30. Additionally, there exists one set of errors in the recorder 18 and another set of noise and errors because of transmission through the telephone lines. When such a signal (in bytes of data) is received by this system from another system, the demodulator portion of modem 20 has to process not only the signal sent but also the errors created by transmission through the telephone line and the errors induced onto the signal by the recorder in the other system. In order to eliminate this problem, before the recorded signal is transmitted, it is demodulated, deserialized, formed into an 8 bit-byte in the processing logic 24 and temporarily stored in the communications buffer 28. From communications buffer 28, the reshaped signal is serialized and remodulated before being transmitted over the telephone line to eliminate any recording errors. Similarly, errors created by transmission from another system are eliminated before being recorded by demodulating, buffering and modulating the incoming signal. When transmitting from one system to another, if the speed of the recorder in the transmitting system never exceeded the speed of the recorder in the receiving system, a buffer larger than one byte would not be needed as the receiving recorder would always keep up with the transmission speed.

The document memory 26 functions to buffer the signal coming over the communications line 30 during a print operation. The rate of transmission over the communications line is around 1200 baud, whereas, the printing speed of printer 14 (e.g., 135 baud) is much less than this transmission rate. With this system, it is also possible for the system operator to key into document memory while the incoming signal, alluded to above, is being received by the system and recorded by recorder 18. Consequently, the operator can key into document memory 26 and play out from document memory 26 while a message is being received over telephone line 30.

In FIG. 1B, an electronic typewriter 32 is shown connected to an electronic unit and power supply 34, recorder 18 and telephone coupler 22. The typewriter 32 includes, inter alia, keyboard 12 and printer 14. For purposes of illustration, printer 14 is shown in FIG. 1B as a ball type element 36. Other buttons to be discussed hereinafter are shown on typewriter 32 on both sides of keyboard 12. The electronic unit and power supply 34 includes processing logic 24, document memory 26, communications buffer 28, serializer/deserializer 16 and modem 20. It is to be understood that with the advancements in large scale integration (LSI) technology, document memory 26 could be placed within typewriter 32 as opposed to being part of separate electronic unit 34.

In FIG. 1B, the aforementioned extra keybuttons on typewriter 32 consist of start document key 38, start print key 40, start record key 42, start playback key 44, receive data key 46 and send data key 48. The operator hits key 38 to commence an operation of keying a document into memory. To get a printout from document memory 26, the start print key 40 is depressed. A recording of what is stored in document memory 26 is made by depressing key 42 which starts a recording session between document memory 26 and recorder 18. An inverse operation between recorder 18 and document memory 26 is initiated upon the depression of start playback key 44. In the latter two keyboard initiated operations, recorder 18 functions as a memory dump for document memory 26. The other two keys 46 and 48 on typewriter 32 are the receive and send data keys, respectively. In a communications mode, if the system operator is keying a document into document memory 26 and a telephone call is received with information to be transmitted, the system can still receive this data via the communications buffer 28 when receive data key 46 is depressed.

A detailed block diagram of the system shown in FIGS. 1A and 1B is set forth in FIG. 2. In this figure, output line 50 from typewriter keyboard 12 consists of 8 parallel data leads and control mode leads for the extra keybuttons on typewriter 32. The printer 14 has a single control lead 54 coming out of it which carries information in the form of a feedback signal which lets the system known when the printer can accept the next byte of data. A recorder relay 56 is located on FIG. 2 below processing logic and sequence control 24. This relay isolates the recorder portion of the recorder 18 from its internal control functions and simply substitutes control from processing logic and sequence control 24. The relay 56 is actuated only when the system utilizes recorder 18. Accordingly, when the system is not operating, recorder 18 can function as a normal dictating machine by dictating into microphone 58 under the control of dictation control 60.

The dictation control 60 also controls: playback amplifier 62, which is a conventional amplifier; a record circuit 64, which includes an erase bias; a record switch 66; a record head 68 for magnetic disk 70; motor control 72 and disk changer 74 for magnetic disk 70. The record switch 66 switches head 68 from the playback state to the record state under control of playback amp 62 and record circuit 64, respectively. A head position switch 76 closes when head 68 is in a start position for recording on disk 70. The output from head position switch 76 is on line 78. A disk in switch 80 detects when the recording surface on disk 70 is available and outputs a signal to this effect on output 82.

The input 84 into motor control 72 starts the motor and rotates disk 70 at a constant velocity. The input 86 into disk changer 74 causes the disk changing mechanism to take a disk from a storage location and transfer it into the recording unit and after the recording operation is completed causes the disk changing mechanism to remove the recorded disk and place it in a storage location.

As seen in FIG. 2, two-position switch contacts 87 on relay 56 separate both outputs 88 and 90 from playback amplifier 62 and record circuit 64, respectively, from processing logic and sequence control 24 and dictation control 60. The output 92 from record switch 66 is also separated from both processing logic and sequence control 24 and dictation control 60 via switch contacts 87. Moreover, the motor control and disc changer inputs 84 and 86, respectively, are divided between the two separate control units by switch contacts 87. The outputs 78 and 82 from head position switch 76 and end of disk switch 80, respectively, input both processing logic and sequence control 24 and dictation control 60 without being broken by switch contacts 87. As stated previously, all of the two-position switch contacts 87 are under control of the data recorder relay 56. If the system is in a normal dictation mode, the recorder 18 would be under the control of dictation control 60 and all of the contact switches 87 of relay 56 would be connected to dictation control 60. However, if recorder 18 were under system control, processing logic and sequence control 24 would actuate data recorder relay 56 over output 94 to cause all of the switch contacts 87 to be connected to processing logic and sequence control 24.

Figure 3:
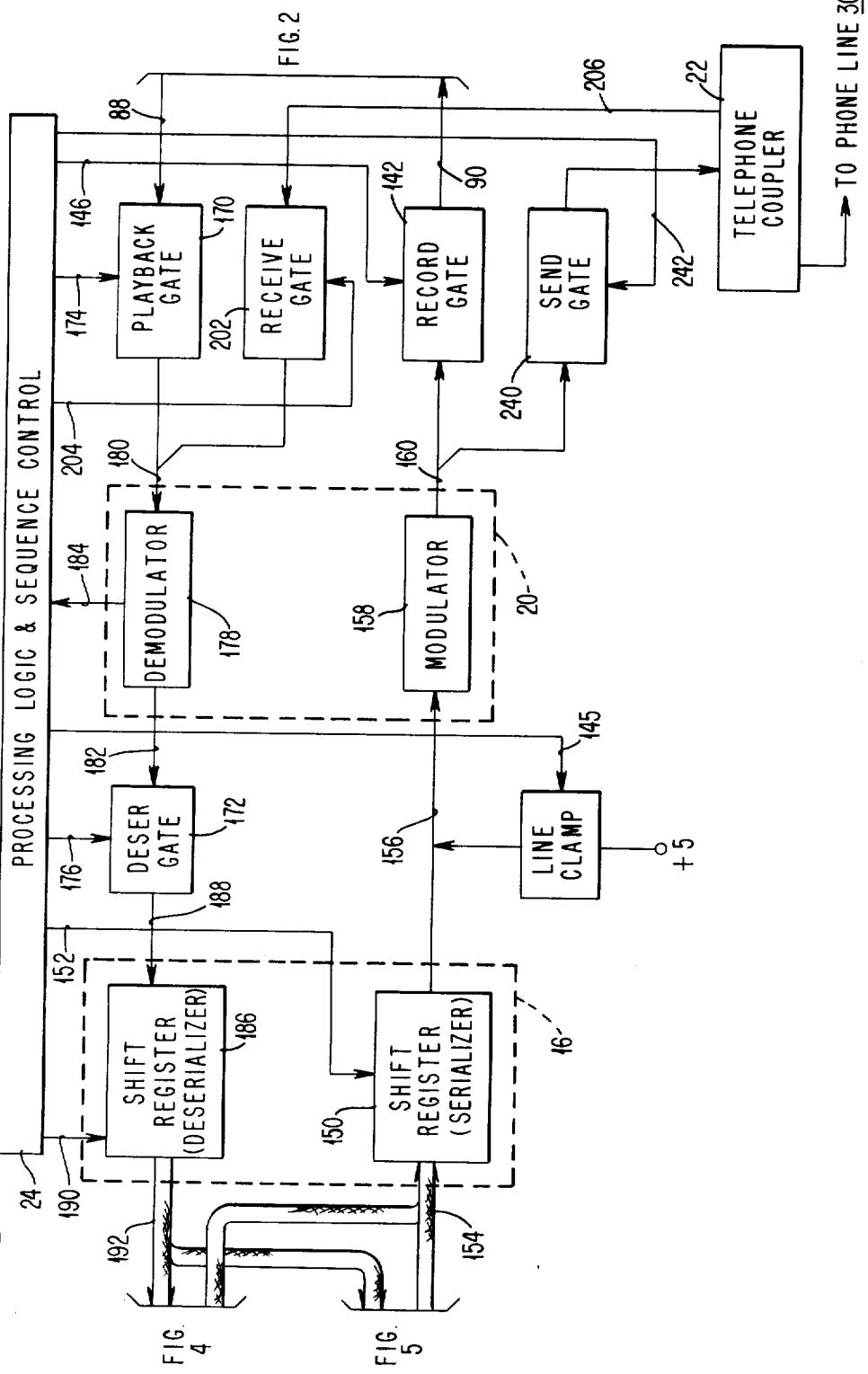
FIGS. 3-5 illustrate in still more detail block diagrams of apparatus and logic for carrying out the functions of the system of the present invention.
Figure 4:
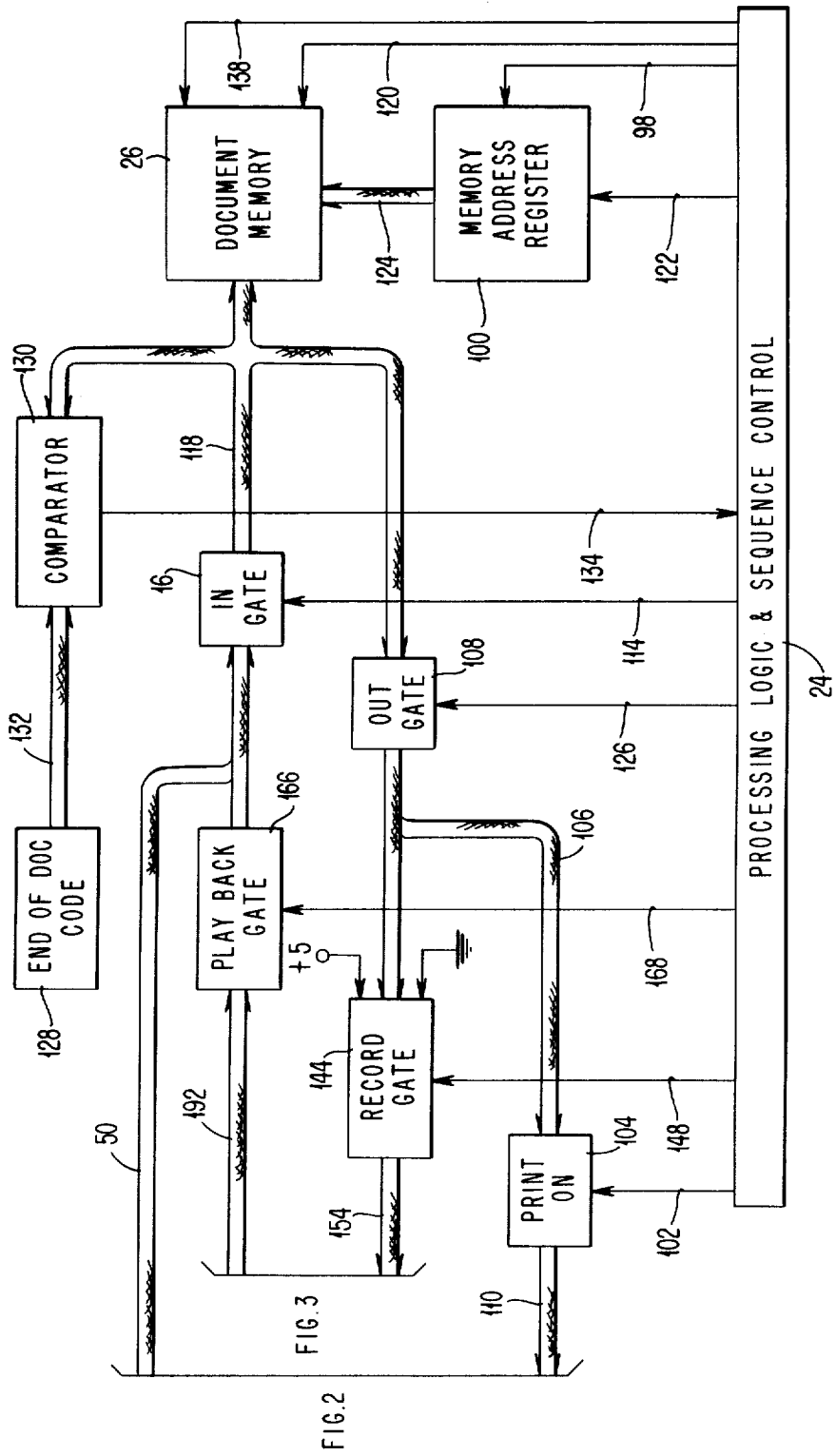

In order to simplify the description of the preferred embodiment, the block diagrams set forth in FIGS. 2-5 will be discussed in conjunction with the different timing diagrams of FIG. 6. When start document keybutton 38 on keyboard 12 is depressed, an output to processing logic 24 appears on line 96 as seen in FIG. 2 and FIG. 6A. Inside processing logic and sequence control 24, as seen in FIG. 4, a signal appears on output 98 to memory address register 100 in response to the output signal 96. In FIG. 4, output pulse 98 resets the memory address register 100 to its zero state in order that the first byte keyed by the operator will go into the first storage position in document memory 26. Thereafter, output 102, controlling gate 104, allows signals on output 106 from OUT gate 108 to enter printer on gate 104, which in turn outputs a signal on line 110 to printer 14 to cause the latter to operate. When the system operator strikes another key (e.g., A) a signal to this effect will appear on output 50 from keyboard 12 as seen in FIG. 2. A keyboard strobe output on line 112, as seen in FIGS. 2 and 6A, enters processing logic and sequence control 26 a short time later. Inside processing logic and sequence control 24, the strobe signal is converted and outputted on lead 114, as seen in FIG. 4, to IN gate 116 to allow the data on output 50 from keyboard 12 to be stored in document memory 26 via output 118. Next, the processing logic and sequence control 24 provides a pulse on output 120 to document memory 26 to cause the data being presented to it from keyboard 12 to be recorded into the first position of document memory 26. Subsequently, the processing logic 24 provides a pulse output 122 to bump the memory address register 100 which in turn addresses the second position in document memory 26 via output 124.

After the operator strikes a second key, output 50 will carry the keyboarded data; output 112 will provide a strobe to processing logic and sequence control 24 indicating when the data is acceptable; a pulse on output 120 will cause the keyboarded data to be written into the second position in memory; and the memory address register will again be bumped via output 122 from processing logic 24.

During the time the keyboarded data is being recorded into document memory 26, an instruction output 126 from processing logic 24 to OUT gate 108 samples the keyboarded data on output 118 and thereafter causes this keyboarded data to be sent via gate 104 and output 110 to printer 14, as seen in FIGS. 2, 4 and 6A. Accordingly, every character struck on keyboard 12 will be printed until the operator strikes the end of document code button 128 on typewriter 32. This end of document code will also be carried by output 50 which contains the data leads from keyboard 12. When this code is forwarded to document memory 26 via IN gate 116, the comparator 130 senses this code via output 132 and outputs a signal to this effect to processing logic and sequence control 24 over output 134. The processing logic 24 in turn generates a printer off signal on output 102 gate 104 to cease the printing operation of printer 14. Consequently, the keyboard to document memory cycle is completed. The amount of keyboarded data in document memory 26 depends upon the number of times that the memory address register 100 was bumped.

In the previously described keyboard to memory cycle, the keyboarded data was also diverted to printer 14. A memory to printer cycle is needed if a second copy of the keyboarded data in document memory 26 is desired. To start this cycle, start print keybutton 40 on keyboard 12 in FIG. 1B is depressed and a signal will appear on output 136 to processing logic and sequence control 24, as seen in FIG. 2. As a consequence of this key depression, processing logic 24 will provide a pulse on output 98 to reset the memory address register 100 to zero. At this time, processing logic 24 outputs a signal, on output 102, to gate 104 which is combined with a signal from OUT gate 108 to start printer 14. As seen in the timing diagram of FIG. 6B, these initial memory to printer steps all occur at the same time. Shortly thereafter, processing logic 24 provides a pulse on lead output 138 which causes a read operation from document memory 26. With the lead output 138 up, document memory 26 will provide to OUT gate 108 the coded information located in the first storage cell of document memory and the OUT gate 108 will thereafter be pulsed over output 126 from processing logic 24. Thus, with printer 14 already on, OUT gate 108 will forward this coded information to 104 where it will in turn be forwarded to printer 14 via output 110. The coded information to be printed by printer 14 is in the form of 8 bit-byte pulses. Following this print operation, the processing logic 24 will place a pulse on output 122, as seen in FIGS. 4 and 6B, which will bump the memory address register 100 to the next storage location in document memory 26. Even though document memory 26 is now ready to supply the next byte of information to printer 14, the system has to wait because printer 14 has sent a "printer not ready to receive subsequent information" signal to processing logic 24 over output 54 in FIG. 2. Nothing will occur until the "printer ready" output line 54 comes up again. When this occurs, the read output line 138 will automatically get a read pulse on it from processing logic 24, as seen in FIG. 4, and the memory OUT gate 108 will allow the stored keyboarded information in the second storage position in document memory 26 to be routed to printer 14 via output 110. Again, following this readout to printer 14, the print ready output line 54 to processing logic 24 will go into a busy state and memory address register 100 will be bumped to point at a subsequent storage location in document memory 26. The foregoing steps continue until during the read operation a coded signal is encountered which compares in comparator 130 with the end of document code 128 as seen in FIG. 4. If they compare, and output 134 to processing logic 24 will occur. This output pulse 134 causes the memory to printer cycle to be terminated when the printer subsequently goes to a ready state.

The system operator can make a permanent record of the keyboarded information stored in document memory 26 by striking start record button 42 on the keyboard 12 of FIG. 1B. This keyboard pulse outputs the keyboard 12 over output 140, as seen in FIG. 2, into processing logic 24 where a pulse is generated on output 98 to reset the memory address register 100 in FIG. 4 in order that it will be pointing at the first storage cell in document memory 26. If a disk is not in the recorder 18 shown in FIG. 2, the end of disk switch 80 will be in an off state and the output 82 to processing logic 24 will reflect this condition. If so, processing logic 24 will provide a disk change signal over output 86 to disk changer 74. In FIG. 2, it is noted that the two position switch 87 between the disk changer 74 and dictation and processing logic controls 60 and 24, respectively, points to processing logic 24 as the recorder 18 is now under system control.

After the disk is in place for recording, outputs 78 and 82 from head position switch 76 and end of disk switch 80, respectively, will both have positive signals on them indicating that both the disk is in place and that head 68 is ready for operation. At this time, the recording gates 142 and 144 of FIGS. 3 and 4 are closed by inputs 146 and 148, respectively, from processing logic 24. A low frequency marking signal of approximately 1300 cycles will be placed on disk 70 at this point to indicate when the head initially moves from its start position. The timing diagram of FIG. 6C follows the foregoing steps and subsequent steps to be discussed in connection with the memory to disk recorder cycle. Thereafter, the processing logic 24 of FIG. 4 will provide an output pulse on 138 to document memory 26 to cause the data in the first storage location to be made available again for use by memory OUT gate 108. Following this, the gate 108 will be pulsed over lead 126, the memory address register 100 in FIG. 4 will be bumped via output 122 and the shift register (serializer) 150 of serializer/deserializer 16, in FIG. 3, will be pulsed via output 152 from processing logic 24. After the memory OUT gate 108 is pulsed over lead 126, the data from document memory 26 will be sent via the record gate 144 and output 154 to serializer 150 in FIG. 3. The 8 parallel bits of data on output 154 are converted to a serial stream of data on output 156 from serializer 150. This serial stream of data is then sent to the modulator 158 of modem 20 wherein the DC pulses are converted to 1300 and 2100 cycle pulses. These signals on output 160 from modulator 158 are sent via record gate 142 and output 90 to the recording logic of the recorder 18 of FIG. 2. Here, the signals pass through recording circuitry 64 and through record switch 66 onto head 68 via interface 162. At the moment the start bit is serialized, the memory address register will be bumped to the next storage position in document memory 26 via output 122 in FIG. 4 as described above. This operation will continue until the last byte in document memory 26 is read and serialized to the recorder 14.

When the last character is read from memory, the code read from document memory again will be the end of document code which will cause comparator 130 to make a comparison of this end of document code with the output code from end of document circuitry 128 of FIG. 4. The output 134 from comparator 130 will cause the sequence control logic of processing logic 24 to terminate this recording mode of operation and to place a pulse on output 86 to disk changer 74 of FIG. 2 to cause the disk in the recorder 18 to be ejected therefrom.

In the recorder to memory mode of operation, the information on the previously recorded disk 70 is placed back into memory for a later printing operation. The system operator initiates this mode of operation by depressing the start playback key 44 on the typewriter keyboard 12 shown in FIG. 1B. In FIG. 2, keyboard 12 generates a signal in response to this keyboard depression on output 164 to processing logic 24. As evidenced by the recorder to memory timing diagram of FIG. 6D, processing logic 24 in FIG. 4 turns on playback gate 166 over output 168 and resets the memory address register 100 over output 98. During this same period, the data recorder relay 56 under the control of processing logic 24 places all of the two position switches 87 of FIG. 2 in a system controlled position. Next, processing logic 24 places a disk change signal on output 86 to disk changer 74 and starts the motor of recorder 18 over output 84. Thereafter, processing logic 24 receives outputs from both disk switch 80 and head position switch 76 over outputs 82 and 78, respectively, indicating that the recorder 18 is now ready for operation.

Next, processing logic 24, as seen in FIG. 3, opens both playback gate 170 and the deserializer gate 172 over outputs 174 and 176, respectively. When the first burst of the 2100 cycle recorded signal is ready by head 68, it provides an input to demodulator 180 via a playback path already established through playback amplifier 62 and output 88 of FIG. 2 and playback gate 170 of FIG. 3, wherein an analog to digital conversion of the information is made. In turn, the demodulator output 182 (a spacing signal caused by the 2100 cycle burst) is sent via output 182, deserializer gate 172 (which was opened when playback gate 170 was first opened) and output 188 to shift register (deserializer) 186 and a "start deserializer clock" output 184 is sent to processing logic 24. The deserializer clock in turn generates the pulses on input 190 to operate the deserializer shift register 186. In the deserializer 186, the serial stream of data is reconverted to 8 parallel bits of data. As seen in the timing diagram of FIG. 6D, stop and start bits have been interjected between each 8 parallel bits of data in order that the data can be accurately identified. The output 192 from deserializer 186 is sent to the playback gate 166 shown in FIG. 4. At the time a stop bit in the byte of data is to be encountered, processing logic 24 places a pulse on output 114 which operates the memory IN gate 116. Next, the processing logic 24 provides an output pulse 120 to document memory 26 to cause the data being presented to it from IN gate 116 to be stored in the first position of document memory 26. Subsequently, the processing logic 24 provides an output pulse 122 to bump the memory address register 100 so that the second position in document memory will be addressed. Each successive byte of information will be processed in the same manner as described until during the processing operation the comparator 130 detects that an end of document code has been read. When such a code is detected, output 134 from comparator 130 will terminate this recorder to memory mode of operation and disk 70 is ejected from recorder 18.

Figure 5:
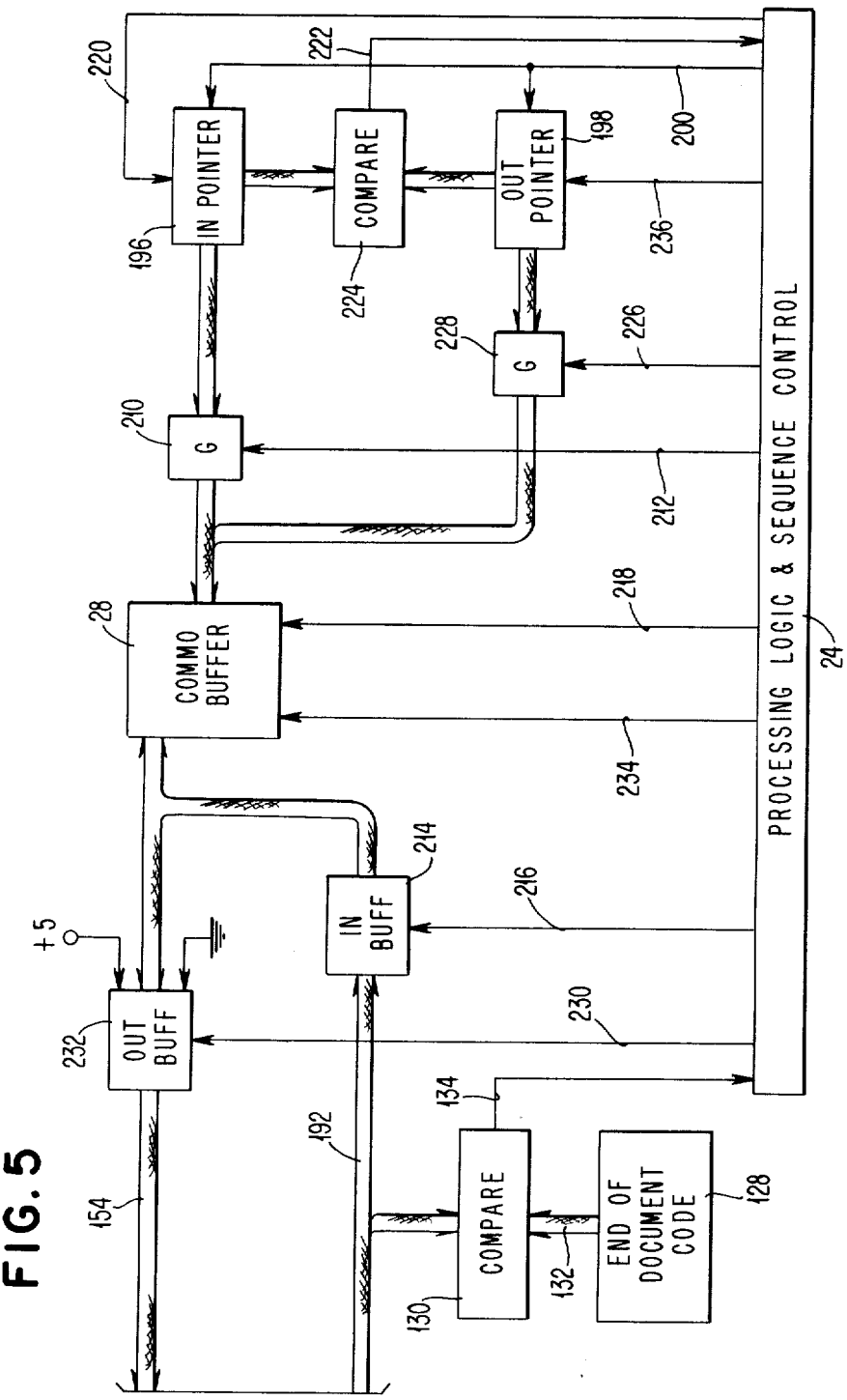
Figures 1, 6E:
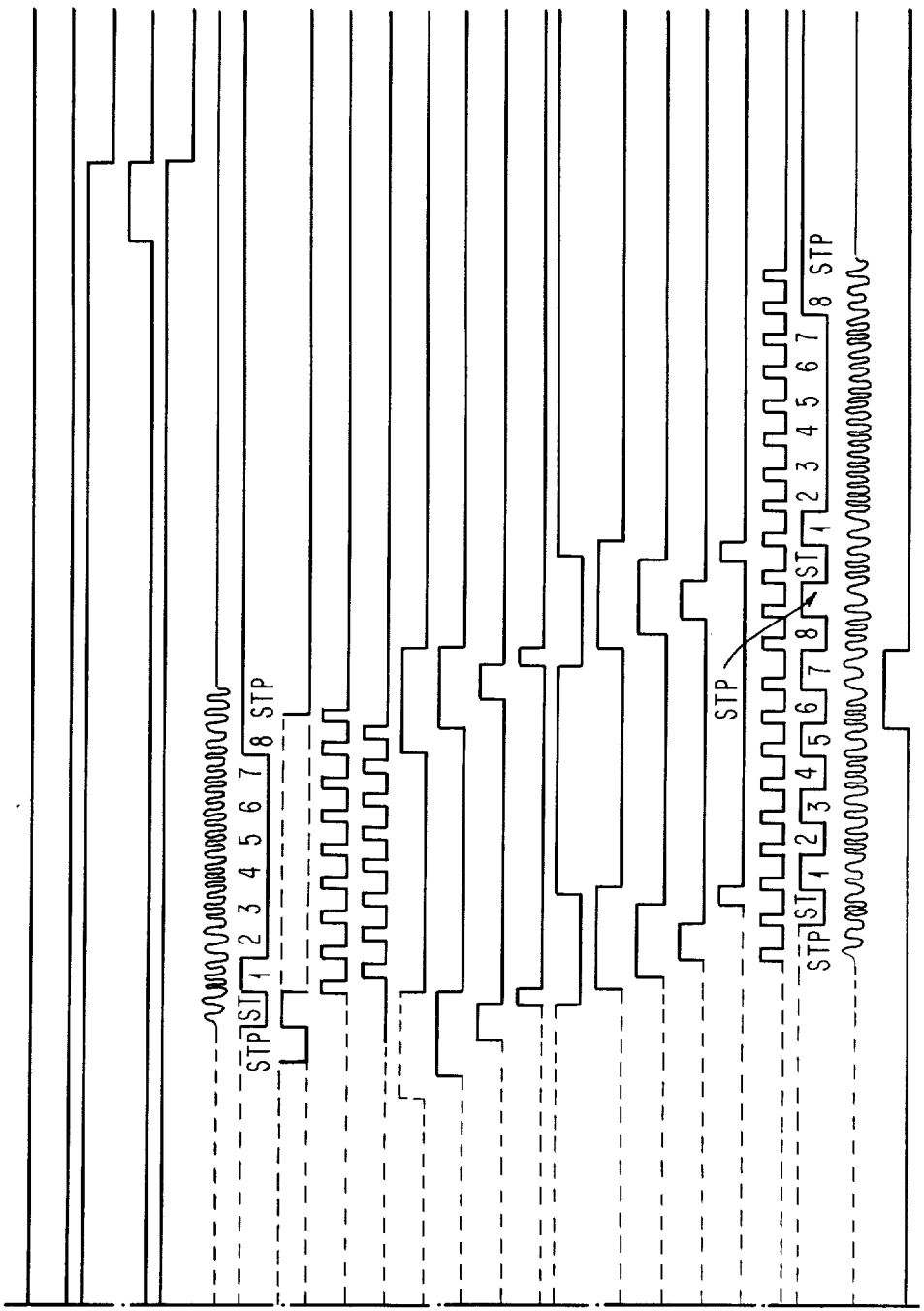

The timing diagram set forth in FIG. 6E is the operating mode wherein data received over the telephone communications line is stored by the system recorder. In this mode of operation, the analog information is taken from the telephone line and demodulated, deserialized and buffered. Usually this mode of operation begins when the system operator receives a telephone call from a party desiring to transmit information to the instant system. The operator of the other system will send a signal (e.g., 1300 cycle tone) to the instant system operator when transmission begins. When the instant system operator hears that tone, the telephone receiver is placed in telephone coupler 22 and receive data key 46 in FIG. 1B is depressed causing a pulse on output 194 in FIG. 2 to processing logic 24. At this time, processing logic 24 of FIG. 5 causes IN pointer 196 and OUT pointer 198, the communication pointers for the communications buffer 28, to be reset to their starting positions via output 200 and also causes a recording disc to be placed into recorder 18 via a command over output 86 in FIG. 2. In FIG. 3, processing logic 24 at this time turns on receive gate 202 over output 204. The receive gate 202 is now connected to the output 206 from telephone coupler 22. The tone originally heard by the system operator (and shown in FIG. 6E at 208) is demodulated and the demodulator 178 in turn sends a "marking" DC signal on output 182 to deserializer 186. The deserializer clock, described above in reference to FIG. 2, will be started when the burst of 2100 cycle spacing signal is received as the first start pulse, as evidenced by the timing diagram in FIG. 6E.

After the first character is received, processing logic 24 of FIG. 5 opens IN gate 210 over output 212 and allows the output from IN pointer 196 to address the communications buffer 28. Thereafter, data from deserializer 186 will input communications buffer 28 after in buffer gate 214 is opened by output 216 from processing logic 24. The above described DC signals are converted by the deserializer 186 into 8 parallel bits of information that will enter the in buffer gate 214 in FIG. 5 over output 192 from FIG. 3. The address IN gate 210 has already coded the first storage location in the communications buffer 28 so that the signal information passing through in buffer gate 214 will be stored in such location. Following this, the processing logic 24 will pulse the write buffer input 218 of the communications buffer 28 in FIG. 5. The first byte of data is then stored in communications buffer 28. Next, the IN pointer address is bumped over output 220 from processing logic 24 to the second storage location in communications buffer 28. If the hold output 222 from comparator 224 indicates that IN pointer 196 and the OUT pointer 198 no longer compare because the IN pointer is now pointing to the second storage location in buffer 28 while the OUT pointer is still pointing to the first storage location in buffer 28, the processing logic 24 will produce pulses on: output 226 to gate OUT gate 228; output 230 to out buffer gate 232; and output 234 which addresses the read-buffer portion of communications buffer 28. This causes OUT pointer 198 to address the communications buffer 28 and send out the buffer the data which was stored in the first storage location. This information is forwarded via out buffer 232 over output 154 to the serializer 150 shown in FIG. 3.

In FIG. 3, the data read out of the first memory position in communications buffer 28 is serialized and remodulated by modulator 158 and is forwarded to the recorder 18 via the record gate 143 and output 90 (in a manner substantially similar to the memory to recorder mode of operation discussed previously). The foregoing operation provides signal information to the recorder that is almost totally free of line distortion. Thereafter, the OUT pointer address is bumped by the output 236 from processing logic 24 in FIG. 5. This sequence of steps continues until an end of document code is received which compares with the end of document code 128 in comparator 130. When such a signal is received, the output 134 from comparator 130 will terminate this mode of operation.

Figures 1, 6F:
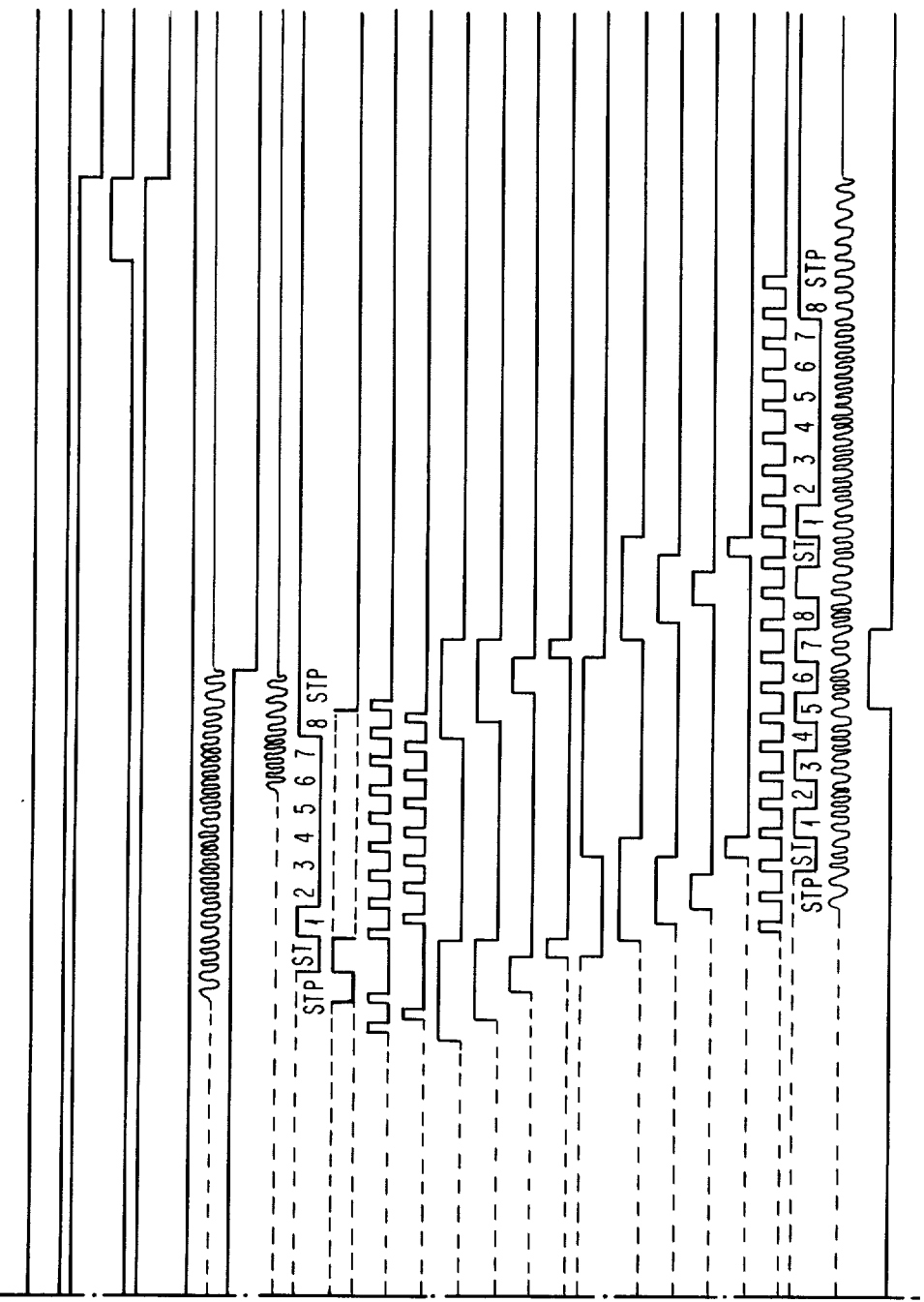

When the steps of the latter mode of operation are reversed, the recorder to communications line steps set forth in the timing diagram of FIG. 6F results. In this situation, the system operator desires to transmit data to a remote location. Accordingly, when the other system is ready, the system operator depresses the send data key 48 on the keyboard 12 shown in FIG. 1B. In FIG. 2, a signal from keyboard 12 inputs processing logic 24 over output 238. This key depression produces a tone on the telephone line which notifies the remote operator when to press her receive data button. Whenever such button is depressed, a connection is established between the two systems.

This keyboard signal causes processing logic 24 via output 200 to reset the IN pointer and OUT pointer 196 and 198, respectively, in FIG. 5. In addition, this signal causes the disk changer to operate and place a disk in the machine (which could be the previously recorded disk) and the send gate 240 is pulsed over output 242 from the processing logic 24 as shown in FIG. 3. Moreover, the processing logic 24 shown in FIG. 4 will close playback gate 166. When the recorder 18 in FIG. 2 starts reading information from the disk 70, the data appearing on output 88 (as seen in FIGS. 2 and 3) will cause the playback gate 170 to be closed when a preamble marking signal is read by the recorder 18. The data is then demodulated and the serial DC signal produced by the demodulator is then deserialized by deserializer 186 and the output 192 therefrom inputs in buffer gate 214 in FIG. 5. As the remaining steps of this mode of operation are exactly the same as those for the latter mode of operation (as evidenced by a comparison of the timing diagrams of FIGS. 6E and 6F), these steps will not be discussed in detail. Thereafter, the data is temporarily stored in communications buffer 28 and outputted over output 154 to serializer 150 in FIG. 3. The serialized data is then modulated by modulator 158 before being sent over the telephone line 30 to the remote system. This operation provides signal information to the telephone line that is free of distortion introduced by the foregoing recording-playback operations. Again, this mode of operation is terminated by a termination signal on output 134 to processing logic 24 in FIG. 5.

Figure 7A:
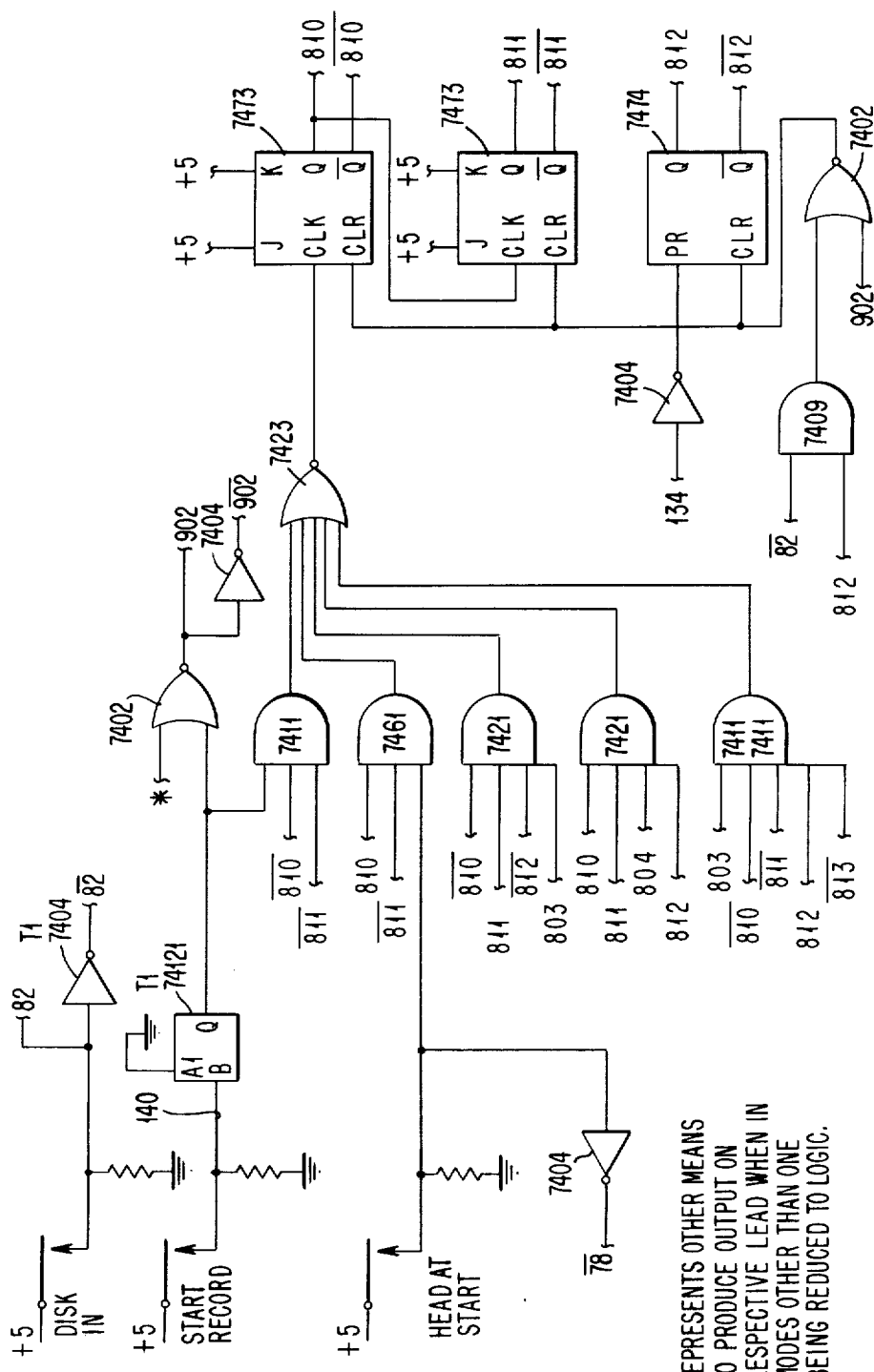
Figures 1, 7A:
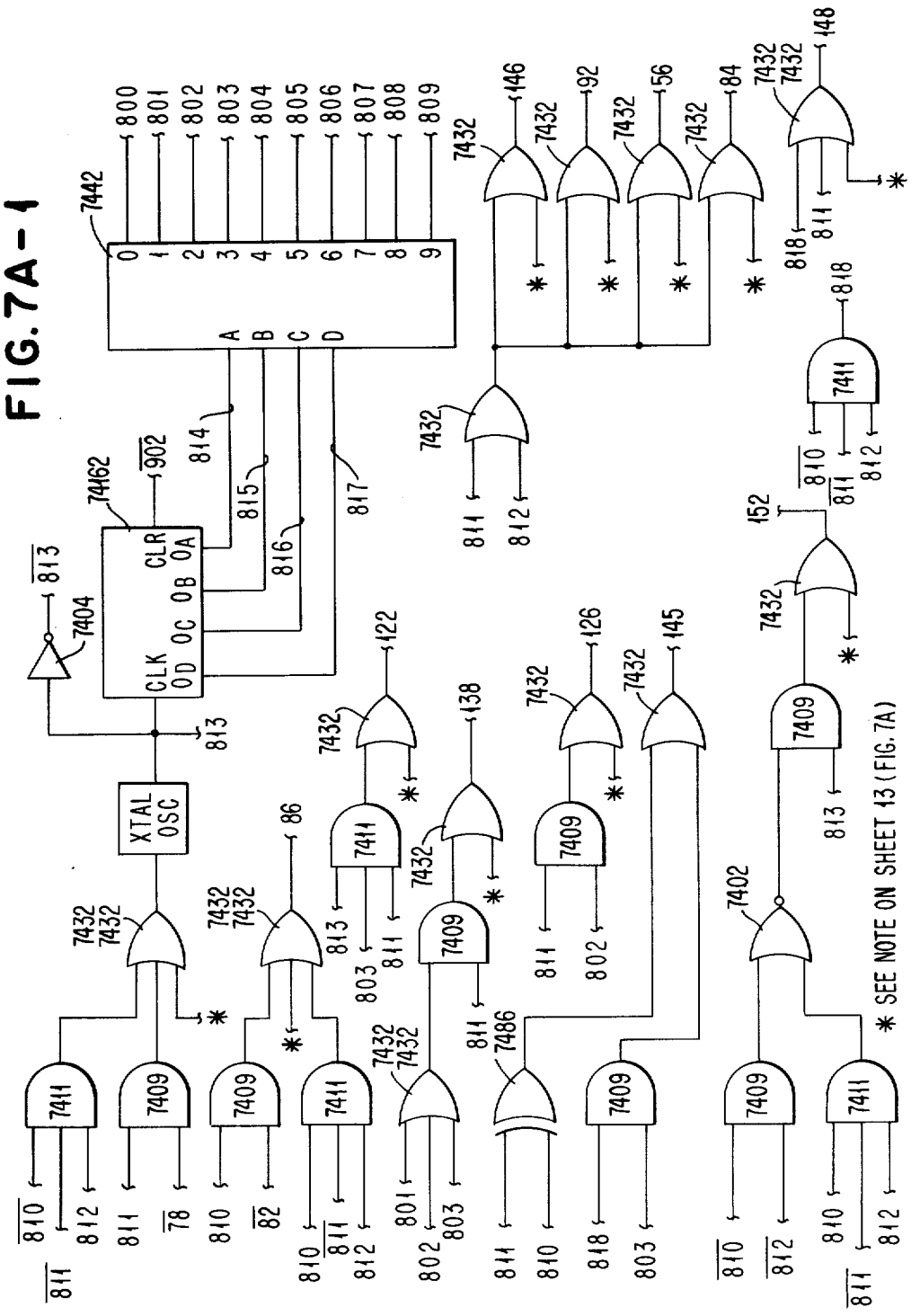

FIGS. 7A and 7B set forth a logic implementation and accompanying timing diagram, respectively, for the memory to recorder mode of operation set forth in the timing diagram of FIG. 6C and discussed in connection with FIGS. 1-4. Even though the block diagrams and timing diagrams are sufficient to enable one skilled in this art to implement this invention, FIG. 7A is disclosed only for the purposes of showing how this invention could be implemented by logic. The following is a glossary of the Texas Instruments TTL modules utilized in the logic of FIG. 7A:

7404—Inverter
TI 74121—Single-Shot
TI 7402—NOR gate
TI 7411—AND gate
TI 7423—NOR gate
TI 7461—AND gate
TI 7421—AND gate
TI 7473—Flip Flop
TI 7474—Latch
TI 7409—AND gate
TI 7432—OR gate
TI 74162—COUNTER
TI 7442—DECODER
TI 7486—Exclusive-OR While this invention has been shown and described with referenced to a preferred embodiment thereof, it will be appreciated by those possessing skill in this art that variations in form and detail may be made therein without departing from the spirit and scope of the invention.

What is claimed is:

1. A type recording and communications system comprising:
 a keyboard;
 means for generating digital signals in response to selective keyboard depressions;
 a memory means for storing the digital signals;
 means for printing human understandable patterns corresponding to the digital signals;
 a recording means for storing analog signals; said recording means being capable of recording audio voice and audio tone signals;
 means for providing communication of audio tone signals between said type recording and communications system and a remote system;
 means for converting the digital signals corresponding to the selective keyboard depressions into audio tone signals suitable for recording by said recording means;
 means for converting audio tone signals from said recording means into corresponding digital signals suitable for storage in said memory means;
 means operatively connecting said means for converting digital signals and said means for converting audio tone signals between said recording means for storing analog signals and said means for providing communication to convert audio tone signals to be transmitted to said remote system to digital signals and reconvert the digital signals to audio tone signals to eliminate distortion from the recorded analog tone signals.

2. The type recording and communications system of claim 1 wherein analog tone signals received by said type recording and communications system are converted to digital signals and reconverted to analog tones by said means operatively connecting said means for converting digital signals and said means for converting audio tones to eliminate distortion created by transmission of the analog tone signals from said remote system.

3. The type recording and communications system of claim 2 wherein said recording means is a magnetic recording dictation unit.

4. The type recording and communications system of claim 2 wherein said means for converting digital signals is a modulator and said means for converting analog tone signals is a demodulator.

5. The type recording and communications system of claim 4 wherein said modulator transforms the digital signals into analog tones of two distinguishable frequency levels before said recording means records the analog tones; the analog tones having frequency levels of approximately 1300 and 2100 cycles.

6. The type recording and communications system of claim 4 further including temporary storage means operatively connected between said demodulator and said modulator for eliminating recording and transmission errors from the analog tone signals transmitted between said recording means and said remote system.

7. The type recording and communications system of claim 6 further including means operatively connected between said demodulator and said temporary storage means for deserializing the digital signals, and means operatively connected between said temporary storage means and said modulator for serializing the digital signals from said temporary storage means.

8. The type recording and communications system of claim 7 wherein the deserialized digital signals are routed to and stored in said memory means.

9. A recording and communications apparatus for operating in a communications mode wherein signals are transmitted to a remote location and received from a remote location, and in a local mode wherein signals are generated, stored and displayed including:
 input means for sequentially generating digital information signals when operating in a local mode;
 a buffer storage means responsive to said input means for storing a plurality of digital information signals;
 a display apparatus selectively reponsive to said buffer storage means for displaying visual representations of the stored digital information signals;
 a communication line for transmitting audio tone signals to the remote location and for receiving audio tone signals from the remote location;
 modulator means responsive to the digital information signals stored in said buffer storage means for generating corresponding audio tone signals when operating in the local mode;
 audio recording and playback apparatus responsive to a first control signal for selectively operating in a first mode wherein prerecorded audio messages in human understandable form are played out to an operator and for operating in a second mode wherein said apparatus is responsive to the audio tone signals generated by said modulator means for recording said audio tone signals;

said audio recording and playback apparatus being responsive to a second control signal for playing out said recorded audio tone signals;

a demodulator means responsive to the second control signal and to said audio recording and playback apparatus when operating in both the local and communications mode for demodulating the played out audio tone signals into digital signals and responsive to said communications line when operating in the communications mode for demodulating received audio tone signals into digital signals;

said modulator means being responsive to said demodulator means when operating in the communications mode for generating audio tone signals corresponding to the digital signals received from said demodulator means;

said buffer storage means being responsive to said demodulator means when operating in the local mode for storing the digital signals obtained from said demodulator means.

10. The recording and communications apparatus of claim 9 wherein said modulator when operating in the communications mode interfaces both said audio recording and playback apparatus and said communications line; said modulator providing an analog signal substantially free of distortion to both said audio recording and playback apparatus and said communications line.

11. The recording and communications apparatus of claim 9 wherein said input means is the keyboard of a typewriter and said display apparatus is the print element of the typewriter; said buffer storage means being the electronic memory of the typewriter.

12. The recording and communications system of claim 9 wherein said audio recording and playback apparatus is a magnetic recording dictation unit; said audio recording and playback apparatus functioning as a dictation unit when in said first mode of operation and functioning as a recorder of audio tones when in said second mode.

13. A type recording and communications system comprised of an electronic typewriter having buffer memory, a dictation unit for making magnetic recordings, a telephone communications line and a modem connected in the system to isolate said typewriter, said dictation unit, and said telephone communications line from each other, wherein the improvement comprises:

said dictation unit only recording analog signals;

said communications line only transmitting and receiving analog signals;

said modem converting the digital signals from said typewriter into analog signals appropriate for recording in said dictation unit and reconverting analog signals from said dictation unit into digital signals for storage by said typewriter buffer memory, said modem being connected to convert the analog signals transmitted between said dictation unit and said communications line to digital signals and to reconvert the digital signals to analog signals to eliminate distortion and noise created by transmission of the analog signals through said communications line to said dictation unit and to eliminate distortion and noise created by playback of the analog signals from said dictation unit to said communications line.

14. The type recording and communications system of claim 13 further including a communications buffer operatively connected between the modulator and demodulator stages of said modem to eliminate transmission and recording errors from the analog signals transmitted between said dictation unit and said communications line.

* * * * *